Nov. 30, 1926. 1,608,692
F. S. BOLTZ
COMBINATION TRUCK AND EXTRACTOR BASKET
Filed July 28, 1925   2 Sheets-Sheet 2
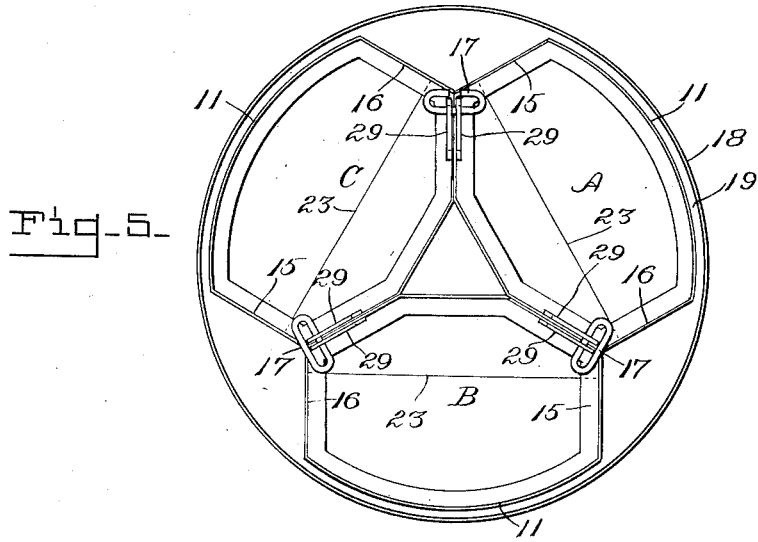
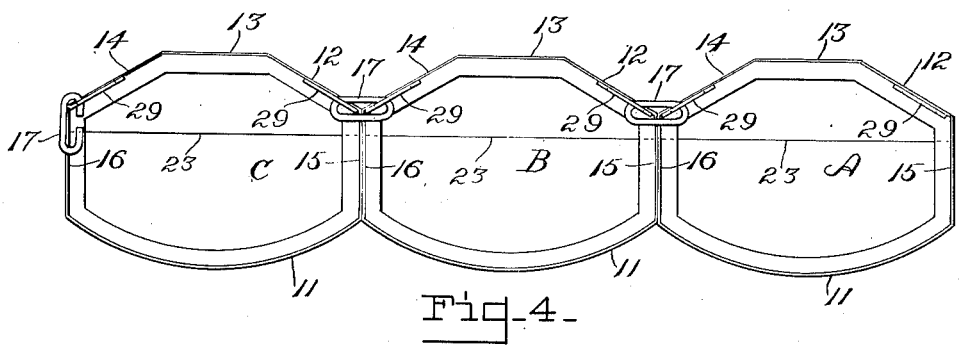
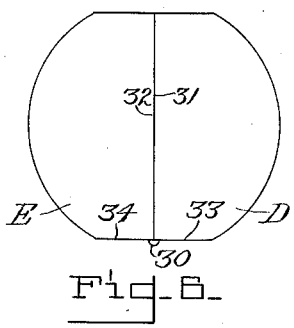
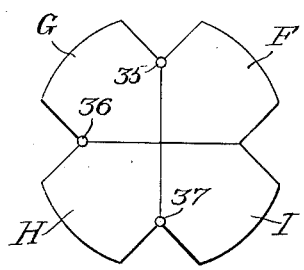
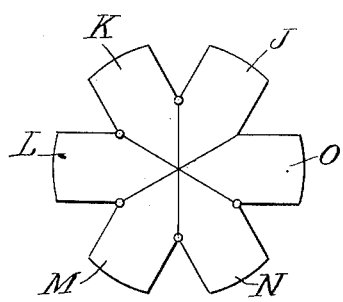

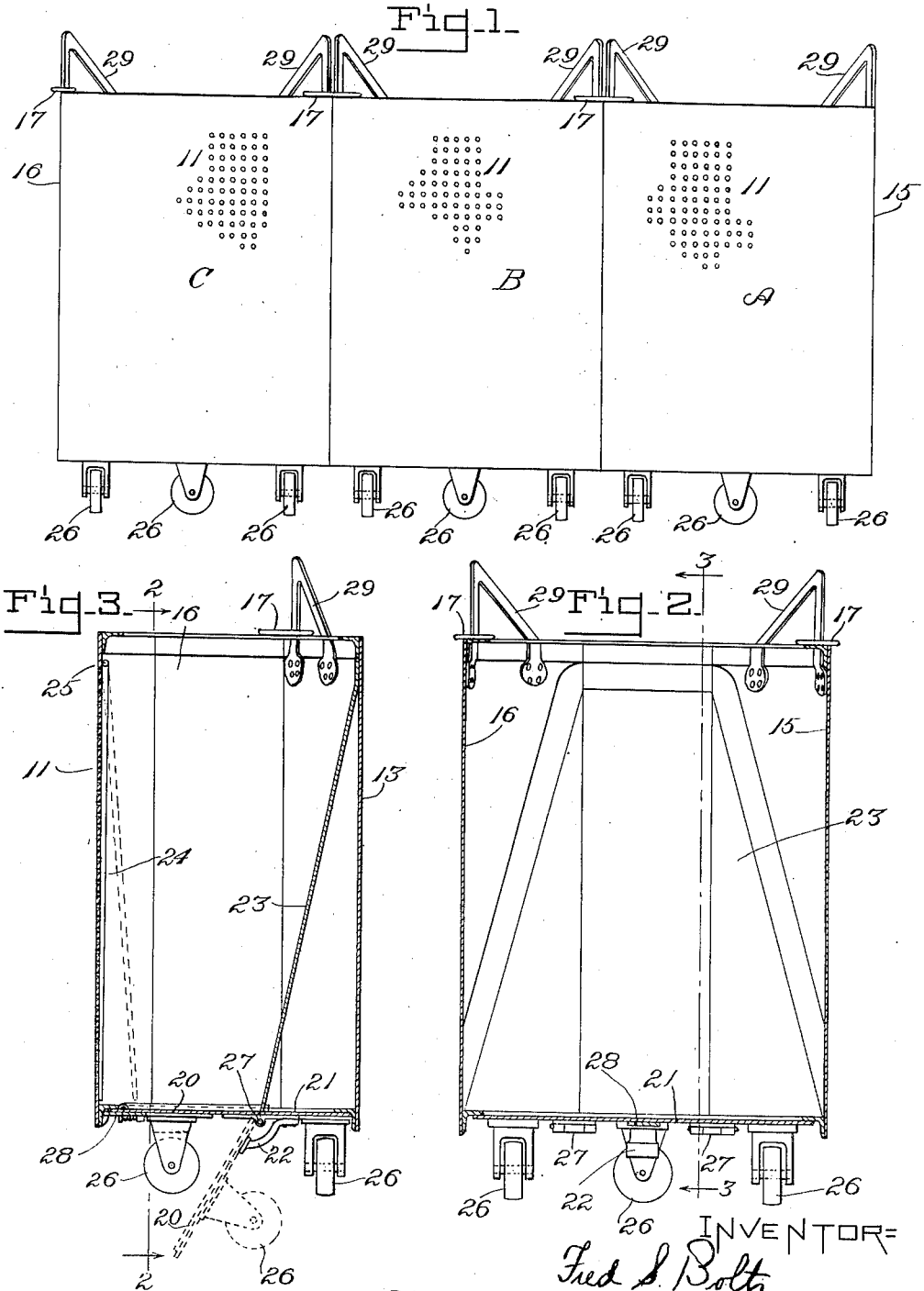

Patented Nov. 30, 1926.

1,608,692

UNITED STATES PATENT OFFICE.

FRED S. BOLTZ, OF MANSFIELD, MASSACHUSETTS.

COMBINATION TRUCK AND EXTRACTOR BASKET.

Application filed July 28, 1925. Serial No. 46,627.

The invention relates to a combination truck and extractor basket. It is especially intended for use in laundries but is adapted for use in other industries relating to textile goods.

In laundries it has heretofore been the practice in transferring the washed articles from the wash wheel to the extractor in which the water is driven out by centrifugal force to first lift the articles out of the wash wheel into a truck, then wheel the truck to a position alongside the extractor, then remove them from the truck and deposit them into a basket within the centrifugal extractor, then after the extracting operation to remove them by hand therefrom and deposit them in another basket. The object of the present invention is to provide a combination truck and extractor basket into which the washed articles are deposited from the wash wheel and which can then either be wheeled or carried by trolley along the side of the extractor and then the basket hoisted into the extractor or instead of wheeling the truck to the extractor, the truck may be hoisted directly from alongside the wash wheel into the extractor frame if the distance is not too far, the articles remaining in the same combination truck and basket while within the extractor and during its operation, then hoisting the said combination truck and basket bodily out of the extractor backet frame and transferring it to any point desired, all these operations being done without any handling of the articles from the time they are removed from the wash wheel until they have been carried away from the extractor.

The invention will be fully understood from the following description when taken in connection with the accompanying drawings and the novel features thereof will be pointed out and clearly defined by the claims at the close of this specification.
In the drawings:

Fig. 1 is a side elevation of a three compartment device embodying the invention.

Fig. 2 is a vertical sectional view of one of the compartment sections on line 2—2, Fig. 3.

Fig. 3 is a vertical sectional view on the line 3—3, Fig. 2, showing the door hinged in the bottom and showing in dotted lines the door turned down into position for discharging the articles.

Fig. 4 is a plan view of the device shown in Fig. 1.

Fig. 5 is a plan view showing the several compartments of the device folded on their hinges into juxtaposed relation in compact form and positioned within the extractor basket frame, the extractor basket frame being shown in diagram.

Figs. 6, 7 and 8 are diagrams showing devices embodying the invention having respectively two compartments, four compartments and six compartments.

Referring to the drawings:

There is shown at A, B and C the three sections or compartments of the combination truck and extractor basket embodying the invention.

The compartments are of equal size and shape. In the form shown in Figs. 1 to 5 each compartment is hexagonal having one side wall arc shaped, as shown at 11, the opposite side walls 12, 13 and 14 disposed at an angle to one another their combined length being substantially equal to the length of the arc shaped wall 11, the walls 12 and 14 standing at the same angle to the intermediate wall 13. The two end walls 15 and 16 are substantially parallel to each other. It is not necessary however to make the compartments hexagonal nor to have the outer wall arc shaped or to make the compartment of any other particular form.

Each end of the compartments A and C respectively is connected to the middle compartment B by a hinge 17 at the inner corner of the end walls 15 and 16 and the walls 12 and 15 respectively of the adjacent compartments so that the two end compartments may be folded on their hinges into the position shown in Fig. 5 in which the folded combination truck and basket is shown in position in the extractor basket frame 18.

When the device is folded, the walls 12, 14 of adjacent compartments abut against each other, as shown in Fig. 5. The outer periphery of the combined three compartments of the folded device should preferably be of slightly less diameter than the inside diameter of the extractor basket frame 18 so as to allow a space 19 between the periphery of the folded basket truck and the extractor basket frame before they begin to revolve, but this space should be so slight that after they begin to revolve the combination truck and basket will expand so that the outside periphery of the combination basket and truck will conform to the inner periphery of the extractor basket frame 18.

Each compartment has a trap door section 20 hinged to the fixed bottom portion 21 and opening downward to permit discharge of the washed clothes or other articles being treated through the bottom. The trap door is shown as hinged at 27. A spring catch 28 is secured to the fixed bottom on the opposite side from the hinge 27 to engage the swinging end of the trap door to normally hold it in closed position. A stop member 22 is provided secured to the fixed portion 21 of the bottom of the compartment and having an arm which extends to a position somewhat below the trap door in position to limit the downward drop of the door, as shown in Fig. 3. This stop should be so positioned that when the trap door has opened as far as allowed by the stop, it will be inclined at an acute angle to the plane of the bottom so as to serve as an inclined chute or guide for the clothes which are discharged through the bottom opening.

An inclined deflector plate 23 is provided which, at its upper end, is secured to one side of the compartment, the said plate being inclined downwardly toward the opening for the trap door, as shown in Fig. 3, so that the articles in the compartment will be guided downward toward the opening.

A push rod 24 is pivotally connected at 25 to the side of the compartment opposite the deflector plate 23, its lower end extending down to the bottom of the compartment but swinging free at its lower end. Owing to the centrifugal force due to the rotating extractor, there is a tendency of the clothes in the compartment to be thrown against the sides of the walls of the compartment and to cling thereto. The rod 24 is for the purpose of pushing the clothes away from the side wall. Its lower end hangs free above the trap door opening and when the trap door is open, the attendant may extend his hand up through the opening and grasp the lower end of the rod 24 and move it backward and forward to push the clothes away from the wall and to guide them toward the opening in the bottom.

Each compartment is provided with a plurality of wheels or casters 26 having a swivel connection with the bottom of the compartment. Preferably there are three of these casters for each compartment and one of them is secured to the trap door 20. The trap door can be opened only when the combination truck and basket is raised from the floor. The said combination basket will usually be lifted out of the extractor by a hoist and the trap door should be opened while the said combination basket is suspended above the floor.

Each compartment is provided with one or more hangers 29, preferably two, to enable it to be hung upon a hoist. Preferably these hangers extend somewhat above the top of the compartment. They are so disposed on the several compartments that when the several compartments are folded on the hinges so as to bring them into position, shown in Fig. 5, all of the hangers will be brought into juxtaposition so arranged that they may altogether be engaged at the same time by one member of the hoist.

The casters or wheels may be entirely omitted if the device is to be handled entirely by a hoist, and it is intended that the other features of the invention shall be covered by the claims even if the wheels or casters are omitted.

The number of compartments may be as many as desired.

In the modification shown in Fig. 6 the device is shown as having two compartments D, E hinged together at 30 and being free at the other ends so that they can be turned back on the hinge. When in the compact position shown in Fig. 6, the sides 31 and 32 of the two compartments are in abutting relation to each other and the ends 33, 34 are in alinement with each other. When the two compartment members are opened out by turning them on the hinge 30, the ends 33 and 34 will swing around into abutting relation to each other and the sides 31, 32 will come into alinement with each other.

In the modified form shown in Fig. 7 the device is shown as having four compartments F, G, H, and I, the compartment F being hinged to the compartment G at 35, the compartments G and H being hinged together at 36 and the compartments H and I being hinged together at 37, the compartments I and F being unconnected so as to permit the several compartments to be opened out into straight line but when they are folded they will come together as shown in Fig. 7.

In the modified form shown in Fig. 8 the device is formed with six compartments J, K, L, M, N and O which are all hinged together, each hinged to its adjacent compartment except that the two compartments J, O are not hinged together so as to allow them to be spread open.

My device has numerous advantages over the ordinary method of handling clothes in a laundry. There is a great saving of labor by not having to remove the goods from a truck by hand into the extractor and then not having to remove them by hand from the extractor. The entire load can be handled by a hoist to deliver it both into and from the extractor.

There is a saving of time in that it can be loaded or unloaded more quickly than by the other means.

It affords a much better method of handling the goods as all pulling strain such as used in hand handling is eliminated. The extractor can be of much larger capacity for the same diameter by increasing its height, because the goods are not removed by hand from the top but are discharged through the bottom. In the ordinary construction where the goods have to be removed from the top, it is not practical to make the extractor above a certain height on account of the difficulty of removing the goods.

As the extractor basket is made in separate compartments it will be impossible to load an extractor with goods so that they will extend across the axis of the combination basket and truck.

There is a great saving of floor space as by increasing the height it can be made of less diameter for the same capacity.

What I claim is:

1. A combination truck and extractor basket comprising a plurality of compartment members hinged together on vertical axes in such manner that they may be either disposed in a row or folded into close contact with each other.

2. A combination truck and extractor basket comprising a plurality of compartment members hinged together on vertical axes in such manner that they may be either disposed in a row or folded into close contact with each other, each compartment being provided with swivel casters on its bottom.

3. A combination truck and extractor basket comprising a plurality of compartment members hinged together on vertical axes, in combination with an extractor frame of greater diameter than the folded compartment device whereby when the truck is in the extractor frame there will normally be a space between the outer periphery of the folded compartment device and the inner periphery of the extractor frame.

4. A combination truck and extractor basket comprising a plurality of compartment members hinged together on vertical axes in such manner that when folded on their hinges into close formation, the adjacent side walls of the several sections will abut against each other.

5. A combination truck and extractor basket comprising a plurality of compartment members hinged together on vertical axes in such manner that they may be either disposed in a row or folded into close contact with each other, the outer walls of the several compartments being reticulated.

6. A combination truck and extractor basket comprising a plurality of compartment members hinged together on vertical axes in such manner that they may be either disposed in a row or folded into close contact with each other, each compartment having a bottom provided with a hinged door which opens downwardly.

7. A combination truck and extractor basket comprising a plurality of compartment members hinged together on vertical axes in such manner that they may be either disposed in a row or folded into close contact with each other, each compartment having a bottom provided with a hinged door which opens downwardly, each compartment having a deflector plate which extends from one side of the upper part to the bottom and inclines toward the opening which is closed by the trap door.

8. A combination truck and extractor basket comprising a plurality of compartment members hinged together on vertical axes in such manner that they may be either disposed in a row or folded into close contact with each other, each compartment having a bottom provided with a hinged door which opens downwardly, each compartment having a downwardly extending rod hinged at its upper end to the upper part of one of the side walls of the compartment and its lower end hanging free in such a position that it is accessible through the open bottom when the trap door is open to permit the rod to be manually operated to push the articles contained in the compartment away from the side of the compartment toward the trap door opening.

9. A combination truck and extractor basket comprising a plurality of compartment members hinged together on vertical axes in such manner that they may be either disposed in a row or folded into close contact with each other, each compartment having at its upper end a hanger adapted for aid in lifting the combination truck and basket.

10. A combination truck and extractor basket comprising a plurality of compartment members hinged together on vertical axes in such manner that they may be either disposed in a row or folded into close contact with each other, each compartment having at its upper end a hanger adapted for aid in lifting the combination truck and basket, the hangers of the several compartments being so relatively arranged that when the compartments are folded into close formation, the said hangers will all come into juxtaposition, adapted to be all engaged by a single hoisting member.

11. A combination truck and extractor basket comprising a plurality of independent compartment members so constructed and of such contour that they may at will either be arranged in a row with walls of adjacent compartment members abutting against each other or they may be placed in compact arrangement in continuous series so that certain other walls of the several compartments shall be contiguous.

12. A combination truck and extractor basket comprising a plurality of independent compartment members so constructed and of such contour that they may at will either be arranged in a row with walls of adjacent compartment members abutting against each other or they may be placed in compact arrangement in continuous series so that certain other walls of the several compartments shall be contiguous, in combination with a basket frame shaped to receive the several compartment members when in the compact arrangement.

13. A combined truck and extractor basket comprising a plurality of compartment members each having a bottom provided with a hinged door which opens downwardly, each compartment having a deflector plate which extends from one side of the upper part to the bottom and inclines toward the opening which is closed by the trap door.

14. A combination truck and extractor basket comprising a plurality of compartment members each compartment having a bottom provided with a hinged door which opens downwardly, each compartment having a downwardly extending rod hinged at its upper end to the upper part of one of the side walls of the compartment, its lower end hanging free in such a position that it is accessible through the open bottom when the trap door is open to permit the rod to be manually operated to push the articles contained in the compartment away from the side of the compartment toward the trap door opening.

15. A combination truck and extractor basket comprising a plurality of independent compartment members so constructed and of such contour that they may be placed in compact arrangement in continuous series, each compartment having at its upper end a hanger adapted for aid in lifting the combination truck and basket, the hangers of the several compartments being so relatively arranged that when the compartments are arranged in close formation the said hangers will all come into juxtaposition adapted to be all engaged by a single hoisting member.

In testimony whereof I affix my signature.

FRED S. BOLTZ.